United States Patent

Hackbarth et al.

[11] 4,035,112
[45] July 12, 1977

[54] ROTARY ENGINE COOLING AND EXHAUST SYSTEM

[75] Inventors: Eugene R. Hackbarth, Kenosha, Wis.; Harry M. Ward, III, Waukegan, Ill.

[73] Assignee: Outboard Marine Corporation, Waukegan, Ill.

[21] Appl. No.: 596,525

[22] Filed: July 16, 1975

Related U.S. Application Data

[63] Continuation of Ser. No. 444,048, Feb. 20, 1974, abandoned.

[51] Int. Cl.² ............ F01C 1/22; F01C 21/06; F02B 55/10
[52] U.S. Cl. ..................... 418/60; 418/83; 123/8.01
[58] Field of Search ............ 418/60, 61 A, 83, 209, 418/212, 215; 123/8.01, 8.07, 8.45

[56] References Cited

U.S. PATENT DOCUMENTS

| 902,762 | 11/1908 | Risley | 418/212 |
|---|---|---|---|
| 914,155 | 3/1909 | Mills et al. | 418/212 |
| 2,369,019 | 7/1956 | Chisholm | 418/212 |
| 3,007,460 | 11/1961 | Bentele et al. | 418/83 |
| 3,077,867 | 2/1963 | Froede | 123/8.07 |
| 3,286,700 | 11/1966 | Froede | 418/83 |
| 3,289,647 | 12/1966 | Turner et al. | 418/60 |
| 3,313,276 | 4/1967 | Ito et al. | 418/61 A |
| 3,572,984 | 3/1971 | Jones | 418/83 |
| 3,777,719 | 12/1973 | Otsubo et al. | 123/8.07 |
| 3,883,273 | 5/1975 | King | 418/60 |

Primary Examiner—John J. Vrablik
Attorney, Agent, or Firm—Michael, Best & Friedrich

[57] ABSTRACT

Disclosed herein is a rotary internal combustion engine comprising a housing assembly including first and second substantially identical housing members extending in spaced, parallel and aligned relation to each other and respectively including wall means partially defining first and second trochoid shaped rotor cavities and additional wall means partially defining first and second water jackets respectively extending partially circumferentially of the cavities and respectively including circumferentially spaced inlet and outlet ends, a first wall member located adjacent to the first housing member remotely from the second housing member and further defining the first rotor cavity and including coolant inlet means communicating with the inlet end of the first water jacket, a second wall member located adjacent to the second housing member remotely from the first housing member and further defining the second rotor cavity and including outlet means communicating with the outlet end of the second water jacket, and an intermediate member located between the housing members, partially defining the rotor cavities and including coolant conduit means communicating between the outlet end of the first water jacket and the inlet end of the second water jacket.

21 Claims, 3 Drawing Figures

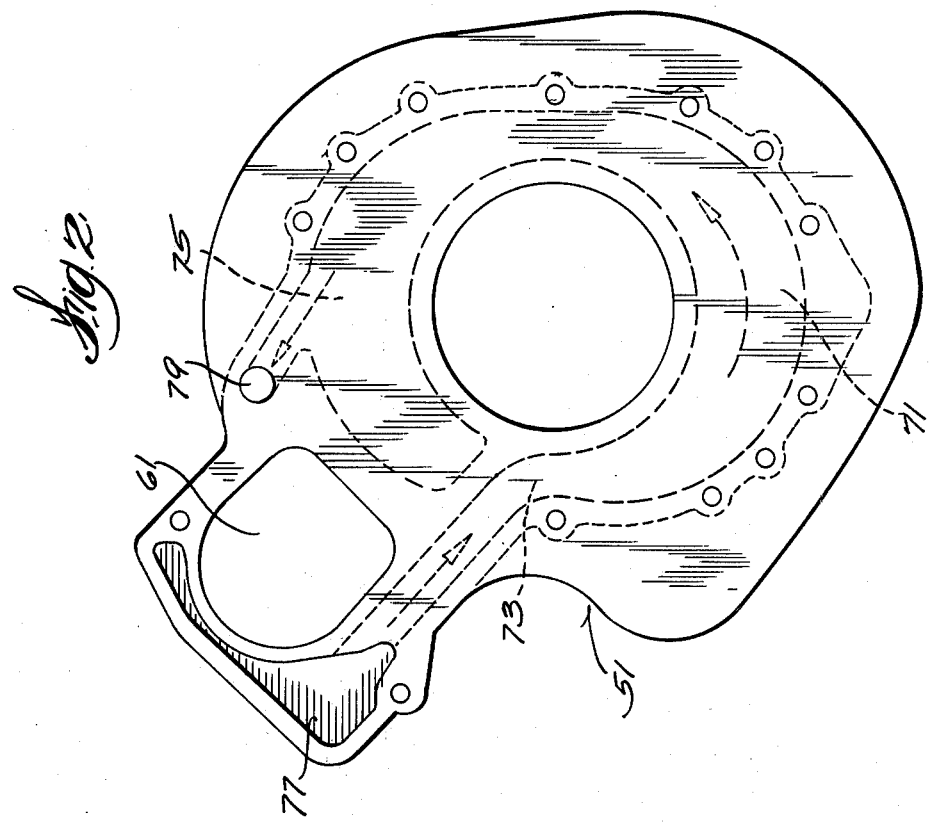
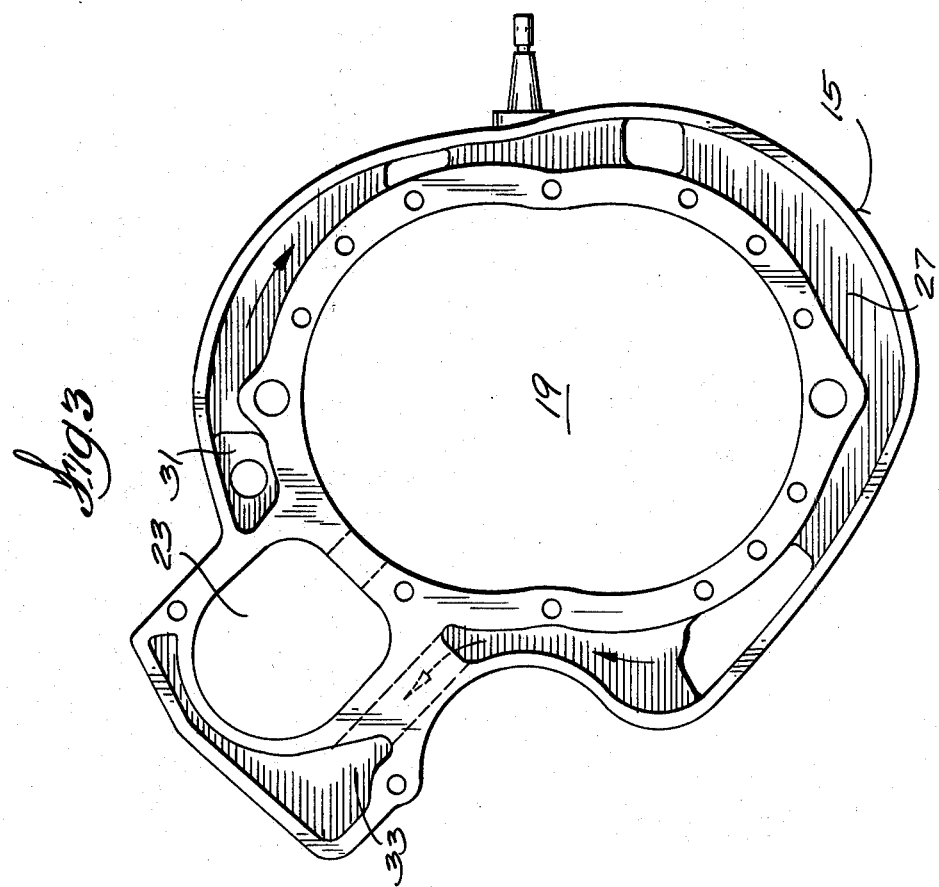

ROTARY ENGINE COOLING AND EXHAUST SYSTEM

This is a continuation of application Ser. No. 444,048 filed Feb. 20, 1974. Reference is also made under 35 USC 120 to application Ser. No. 444,043 filed Feb. 20, 1974.

BACKGROUND OF THE INVENTION

The invention relates generally to rotary internal combustion engines and, more particularly, to multi-rotor rotary internal combustion engines. Still more particularly, the invention relates to liquid cooling arrangements for such multi-rotor engines.

SUMMARY OF THE INVENTION

The invention provides a rotary internal combustion engine comprising a housing assembly including first and second housing members located in spaced, parallel and aligned relation to each other and respectively including wall means partially defining first and second trochiod shaped rotor cavities and additional wall means partially defining first and second cooling jackets respectively extending partially circumferentially of the first and second cavities and respectively including inlet and outlet ends. In addition, the rotary internal combustion engine includes first wall means located adjacent to the first housing member remotely from the second housing member and further partially defining the first rotor cavity and also including a coolant inlet means communicating with the inlet end of the first water jacket, together with a second wall member located adjacent to the second housing member remotely from the first housing member and further partially defining the second rotor cavity and also including outlet means communicating with the outlet end of the second water jacket, and an intermediate member located between the housing members, partially defining the first and second rotor cavities, and also including coolant conduit means communicating between the outlet end of the first water jacket and the inlet end of the second water jacket. In addition, the engine includes means securing together, in series, the first wall member, the first housing member, the intermediate member, the second housing member, and the second wall means.

In further accordance with the invention, the rotary internal combustion engine is preferably constructed so that the housing members are substantially identically constructed and arranged so that the rotor cavities and the cooling jacket inlet and outlet ends are in respective alignment with each other.

In still further accordance with the invention, the coolant conduit means in the intermediate member includes an arcuately extending third cooling jacket located, at least in part, inwardly of the periphery of the rotor cavities and including an inlet end in arcuately adjacent relation to the outlet ends of the first and second cooling jackets and communicating with the outlet end of the first cooling jacket.

In addition, the intermediate or third cooling jacket also includes an outlet end located arcuately adjacent to the inlet ends of the first and second cooling jackets and in communication with the inlet end of the second cooling jacket.

Still further in accordance with the invention, the housing members and the intermediate member are each provided with exhaust passages which are aligned with and communicate with one another, and the first, second and third cooling jackets extend to adjacent to the exhaust passages for cooling thereof.

In still furrher accordance with the invention, the rotary internal combustion engine is constructed so that the first wall member also includes wall means which also partially defines the first cooling jacket, so that the second wall member also includes wall means further defining the second cooling jacket, and so that the intermediate member also includes wall means further defining the first and second cooling jackets.

One of the principal features of the invention is the provision of a multi-rotor rotary internal combustion engine including first and second rotor housing members, each including a cooling jacket extending partially circumferentially of the rotor cavity and in which the coolant flows in series from the cooling jacket in the first rotor housing member to the cooling jacket in the second rotor housing member and in which the flow is circumferential in the same direction in each of the cooling jackets.

Another of the principal features of the invention is the provision of a multi-rotor rotary internal combustion engine including a cooling arrangement embodying substantially identically constructed rotary housing members.

Still another of the principal features of the invention is the provision of a multi-rotor rotary internal combustion engine including an intermediate member which is located between two rotor housing members and includes a water jacket in which the coolant flows circumferentially in the opposite direction from circumferential flow in the cooling jackets provided in the rotary housing members.

Still another of the principal features of the invention is the provision, in an intermediate member located between two rotor housing members, of a cooling jacket located inwardly of the periphery of the rotor cavities.

Still another of the principal features of the invention is the provision of a multi-rotor rotary internal combustion engine incorporating a plurality of stacked members which can be die cast.

Still another of the principal features of the invention is the provision of a multi-rotor rotary internal combustion engine which is economical to construct and which provides an effective cooling arrangement.

Other features and aspects of the invention will become known by reference to the following drawings, general description, and claims.

THE DRAWINGS

FIG. 2 is a view taken generally along line 2—2 of FIG. 1.

FIG. 3 is a view taken generally along line 3—3 of FIG. 1.

Figure 1:
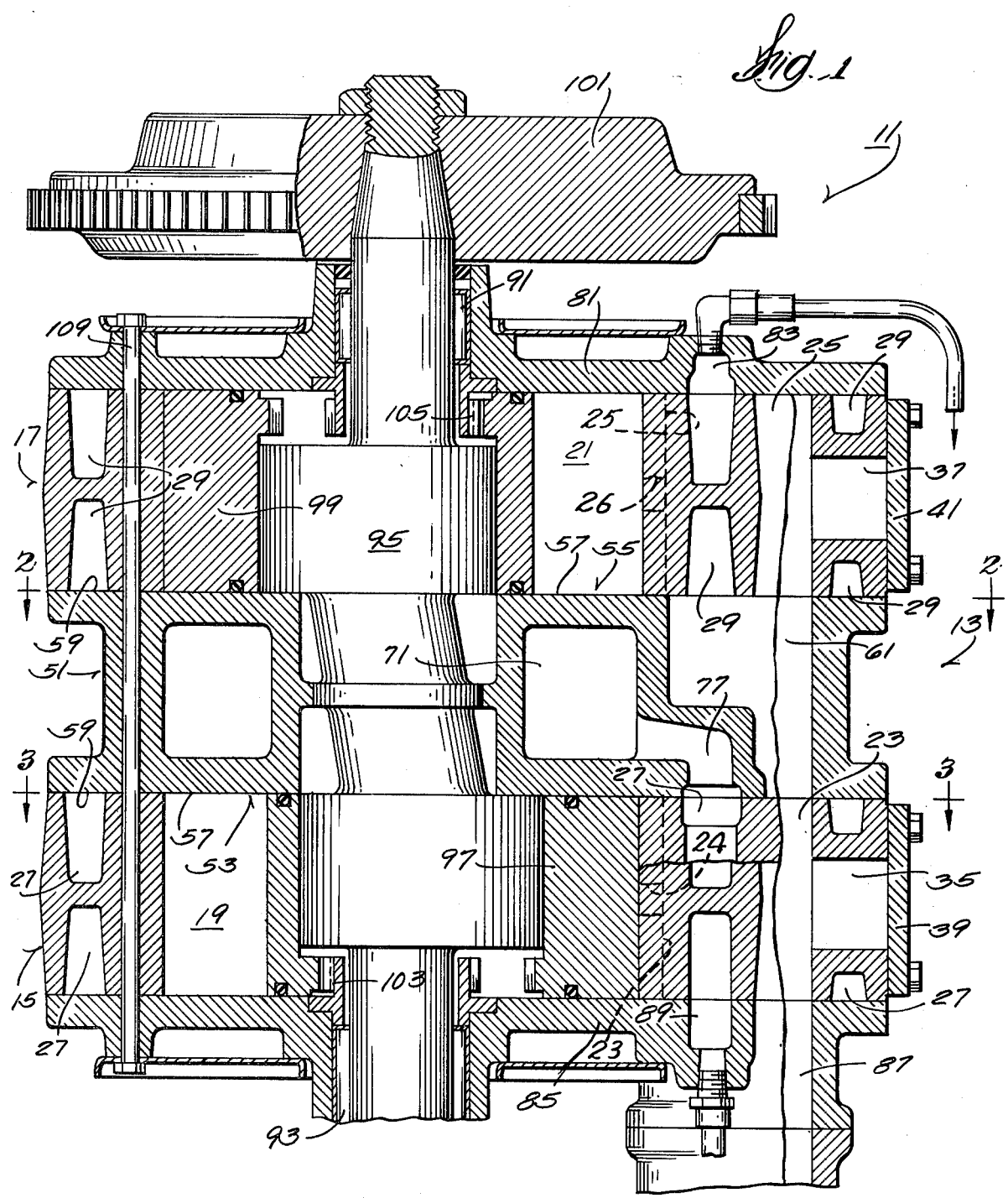
FIG. 1 is a fragmentary, partially schematic, side elevational view, partially broken away and in section, of a multi-rotor rotary internal combustion engine embodying various of the features of the invention.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in the drawings is a rotary internal combustion engine 11 comprising a housing assembly 13 including first and second or lower and upper housing members 15 and 17 which are located in spaced, parallel, and aligned relation to each other and which respectively include wall means defining first and second or lower and upper trochoid shaped rotor cavities 19 and 21. As the housing members 15 and 17 are preferably substantially identical, only the housing member 14 is shown in FIG. 3.

The first and second or lower and upper housing members 15 and 17 further respectively include other additional wall means defining first and second or lower and upper exhaust passages 23 and 25 extending in the direction perpendicular to the parallel relation of the housing members 15 and 17 (i.e., in parallel with the crankshaft still to be disclosed) and located in spaced relation to the rotor cavities 19 and 21 and in alignment relative to each other. The first and second or lower and upper housing members 15 and 17 further include respective additional wall means defining first and second or lower and upper cooling jackets 27 and 29 which respectively extend circumferentially around the rotor cavities 19 and 21 and preferably also at least partially around the exhaust passages 23 and 25. In this regard, the coolant flow in the cooling jackets 27 and 29 is in the clockwise direction from respective inlet ends 31 to respective outlet ends 33.

In addition, the first and second or lower and upper housing members 15 and 17 respectively include still other wall means which define first and second or lower and upper exhaust ducts 24 and 26 which communicate respectively between the first and second rotor cavities 19 and 21 and the first and second exhaust passages 23 and 25.

As the housing members 15 and 17 are preferably die cast, the castings or members additionally respectively include lower and upper bores 35 and 37 which are aligned with the exhaust ducts 24 and 26 in order to facilitate casting and which are closed by respective covers or plates 39 and 41.

The housing assembly 13 further includes an intermediate member 51 which is located between the first and second or lower and upper housing members 15 and 17 and which include lower and upper surfaces 53 and 55 which respectively abut the lower and upper housing members 15 and 17. The upper and lower surfaces 53 and 55 each include wall means 57 (See FIG. 1) additionally defining the first and second rotor cavities 19 and 21 and wall means 59 additionally defining the first and second cooling jackets 27 and 29. In addition, the intermediate member 51 also includes an exhaust passage 61 in alignment with and communicating between the first and second or lower and upper exhaust passages 23 and 25 in the first and second or lower and upper housing members 15 and 17.

The intermediate member 51 further includes coolant conduit means communicating between the outlet end 33 of the lower cooling jacket 27 and the inlet end 31 of the upper cooling jacket 29. In the preferred construction such coolant conduit means comprises a third cooling jacket 71 which is shown in FIG. 2 and which extends interiorly of the intermediate member 51 and arcuately in the area generally inwardly of the periphery of the rotor cavities 19 and 21 preferably at least partially around the exhaust gas passage 61. The third cooling jacket 71 includes an inlet end 73 and an outlet end 75 which is arcuately spaced from the inlet end 73. Within the third cooling jacket 71, coolant flows in the reverse direction from the direction of flow in the cooling jackets 27 and 29 in the housing members 15 and 17. More particularly, the inlet end 73 of the third cooling jacket 71 is located in generally arcuate alignment with the outlet ends 33 of the upper and lower cooling jackets 27 and 29 and communicates through a duct or port 77 with the outlet end 33 of the lower cooling jacket 27. In addition, the outlet end 75 of the third cooling jacket 71 is located in generally arcuate alignment with the inlet ends 31 of the upper and lower cooling jackets 27 and 29 and communicates through a duct or port 79 with the inlet end 31 of the upper cooling jacket 29. Thus, it will be seen that the inlet ends 31 of the lower and upper cooling jackets 27 and 29 are arcuately adjacent to the outlet end 75 of the third or intermediate cooling jacket 71, and the outlet ends 33 of the lower and upper cooling jackets 27 and 29 are arcuately adjacent to the inlet end 73 of the third cooling jacket 71 in the intermediate member 51.

The housing assembly 13 further includes an upper wall member 81 which is located adjacent to the upper or second housing member 17 remotely from the intermediate member 51 and which additionally defines the upper or second rotor cavity 21 and the upper or second cooling jacket 29 and which closes the upper end of the exhaust passage 25 in the upper or second housing member 17. The upper wall member 61 also includes coolant outlet means in the form of a coolant discharge port or duct 83 which communicates with the outlet end 33 of the upper cooling jacket 29. The discharge duct 83 can be arranged to discharge into one of the exhaust passages 23, 25, or 61.

The housing assembly 13 further includes a lower wall member 85 which is located adjacent to the lower or first housing member 15 remotely from the intermediate member 51 and which additionally defines the lower or first rotor cavity 19 and the lower or first cooling jacket 27. The lower wall member 85 further includes an exhaust passage 87 aligned with and communicating with the exhaust passage 23 in the lower or first housing member 15 and having an outlet adapted to be connected in any suitable manner to a discharge pipe or conduit extending from the housing assembly 13. In addition, the lower wall member 85 includes coolant inlet means in the form of a port or duct 89 which communicates with the inlet end 31 of the lower cooling jacket 27. The inlet duct or port 89 can communicate with any suitable source of coolant.

The upper and lower wall members 81 and 85 also support upper and lower bearings 91 and 93 which serve to rotatably support a crankshaft 95 which includes first and second or lower and upper eccentric portions respectively located in the first and second or lower and upper rotor cavities 19 and 21 and rotatably supporting therein respective first and second or lower and upper rotors 97 and 99 which, in response to rotation thereof, define rotating combustion chambers within the first and second or lower and upper rotor cavities 19 and 21.

Mounted on the crankshaft 95 is a flywheel 101.

Lower and upper gear means 103 and 105 are provided on the housing assembly 13 and on the rotors 97 and 99 to effect relative rotation between the rotors 97 and 99 and the housing assembly 13 and between the rotors 97 and 99 and the crankshaft 95 in response to the occurrence of combustion in the rotating chambers.

Suitable means are provided for securing together in a stack the beforementioned upper and lower wall members 81 and 85, the lower and upper housing members 15 and 17, and the intermediate member 51 with the rotor cavities 19 and 21 in alignment and with the exhaust passages 23, 25, 61 and 87 in alignment. In the illustrated construction, such means comprises a plurality of bolts 109 extending through each of the members 15, 17, 51, 81 and 85.

In operation, water is supplied through the inlet duct or port 89 to the inlet end 31 of the lower cooling jacket 27 for circumferential flow in the clockwise direction, as shown in FIG. 3, around the lower rotor cavity 19 to the outlet end 33 of the lower cooling jacket 27. From the outlet end 33 of the lower cooling jacket 27, the coolant flows through the duct 77 in the intermediate member 51 to the inlet end 73 of the intermediate or third cooling jacket 71. Within the intermediate or third cooling jacket 71, the coolant flow is in the counterclockwise direction, as seen in FIG. 2, and inwardly of the periphery of the rotor cavities 19 and 21 from the inlet end 73 to the outlet end 75. From the outlet end 75 of the intermediate or third cooling jacket 71, the coolant flows through the duct or port 79 to the inlet end 31 of the upper cooling jacket 29 and then circumferentially of the upper rotor cavity 21 in the clockwise direction to the outlet end 33, and thence is discharged through the port 83. Accordingly, the disclosed construction advantageously permits utilization of substantially or completely identical housing members 15 and 17 while providing adequate cooling for the housing members 15 and 17 and, in particular, for the intermediate member 51 located between the housing members 15 and 17. Thus both the rotor cavities and the internal exhaust passages 23, 25 and 61 are cooled.

Various of the features of the invention are set forth in the following claims.

What is claimed is:

1. A rotary internal combustion engine comprising a housing assembly including first and second housing members extending in spaced, parallel and aligned relation to each other and respectively including wall means partially defining first and second trochoid shaped rotor cavities and additional wall means partially defining first and second water jackets respectively extending partially circumferentially of said first and second cavities and respectively including circumferentially spaced inlet and outlet ends in fluid communication solely within said respective housing members, a first wall member located adjacent to said first housing member remotely from said secomd housing member and including wall means further partially defining said first rotor cavity and also including coolant inlet means comunicating with said inlet end of said first water jacket, a second wall member located adjacent to said second housing member remotely from said first housing member and including wall means further defining said second rotor cavity and also including outlet means communicating with said outlet end of said second water jacket, and an intermediate member located between said first and second housing members and including wall means further defining said first and second rotor cavities and also including coolant conduit means communicating between said outlet end of said first water jacket and said inlet end of said second water jacket.

2. A rotary internal combustion engine in accordance with claim 1 and further including means securing together, in series, said first wall member, said first housing member, said intermediate member, said second housing member and said second wall member.

3. A rotary internal combustion engine in accordance with claim 1 wherein said rotor cavities and said water jacket inlet ends and outlet ends are respectively aligned with each other.

4. A rotary internal combustion engine in accordance with claim 1 wherein said first and second housing members are substantially identically constructed.

5. A rotary internal combustion engine in accordance with claim 1 wherein said first wall member also includes additional wall means further defining said first cooling jacket, wherein said second wall member also includes additional wall means further defining said second cooling jacket, and wherein said intermediate member includes additional wall means further defining said first and second cooling jackets.

6. A rotary internal combustion engine in accordance with claim 1 wherein said first and second housing members include aligned exhaust passages extending parallel to said wall means partially defining said cavities and said first and second cooling jackets extend adjacent to said exhaust passages.

7. A rotary internal combustion engine in accordance with claim 1 wherein said first and second housing members include aligned exhaust passages extending parallel to said wall means partially defining said cavities and said first and second cooling jackets extend adjacent to said exhaust passages, and wherein said intermediate member includes an exhaust passage in alignment with said exhaust passages in said first and second housing members, and wherein said coolant conduit means comprises an arcuately extending third cooling jacket extending adjacent to said exhaust passage in said intermediate member.

8. A rotary internal combustion engine in accordance with claim 1 wherein said coolant conduit means includes an arcuately extending third cooling jacket having arcuately spaced inlet and outlet ends, and wherein said outlet end of said first cooling jacket is arcuately adjacent to said inlet end of said third cooling jacket and wherein said outlet end of said third cooling jacket is arcuately adjacent to said inlet end of said second cooling jacket.

9. A rotary internal combustion engine in accordance with claim 1 wherein said first and second housing members respectively further including respective second additional wall means respectively defining first and second exhaust passages extending perpendicularly to the parallel relation of said first and second housing members and in spaced relation to said first and second rotor cavities, said first and second housing members further respectively including third additional wall means respectively defining first and second exhaust ducts extending respectively from said first and second rotor cavities to said first and second exhaust passages, said first wall member further including a third exhaust passage aligned with said first exhaust passage and another additional water jacket means extending adjacent to said third exhaust passage.

10. A rotary internal combustion engine in accordance with claim 1 wherein said rotor cavities are aligned and said coolant conduit means comprises an arcuately extending third cooling jacket located at least partially inwardly of the periphery of said rotor cavities.

11. A rotary internal combustion engine in accordance with claim 10 wherein said third cooling jacket includes an inlet end communicating with said outlet end of said first cooling jacket and an outlet end communicating with said inlet end of said second cooling jacket.

12. A rotary internal combustion engine in accordance with claim 11 wherein said inlet end of said third cooling jacket is located adjacent to said outlet end of said first cooling jacket and said outlet end of said third cooling jacket is located adjacent to said inlet end of said second cooling jacket.

13. A rotary internal combustion engine in accordance with claim 1 wherein said first and second housing members respectively further include respective second additional wall means respectively defining first and second exhaust passages extending perpendicularly to the parallel relation of said first and second housing members and in spaced relation to said first and second rotor cavities, said first and second housing members further respectively including third additional wall means respectively defining first and second exhaust ducts extending respectively from said first and second rotor cavities to said first and second exhaust passages, said first wall member further including a third exhaust passage aligned with said first exhaust passage, and said intermediate member further including a fourth exhaust passage aligned with said first and second exhaust passages and additional water jacket means extending adjacent to said third exhaust passage.

14. A rotary internal combustion engine in accordance with claim 13 wherein said first and second housing members are substantially identically constructed.

15. A rotary internal combustion engine in accordance with claim 13 wherein said first wall member further includes a fourth additional water jacket means extending adjacent to said third exhaust passage.

16. A rotary internal combustion engine in accordance with claim 13 wherein said first and second housing members include respective fourth additional wall means respectively defining second and third additional water jacket means extending adjacent to said first and second exhaust passages.

17. A rotary internal combustion engine in accordance with claim 16 wherein said first additional water jacket means is serially connected to and located between said second and third additional water jacket means.

18. A rotary internal combustion engine comprising a housing assembly including first and second substantially identical housing members extending in spaced, parallel and aligned relation to each other and respectively including wall means partially defining aligned first and second trochoid shaped rotor cavities, aligned exhaust passages and additional wall means partially defining aligned first and second cooling jackets respectively extending partially circumferentially of said first and second cavities and adjacent to said exhaust passages and respectively including aligned and circumferentially spaced inlet and outlet ends, a first wall member located adjacent to said first housing member remotely from said second housing member and including first wall means further defining said first rotor cavity and second wall means further defining said first cooling jacket and also including inlet means communicating with said inlet end of said first cooling jacket, a second wall member located adjacent to said second housing member remotely from said first housing member and including first wall means further defining said second rotor cavity and second wall means further defining said second cooling jacket and also including outlet means communicating with said outlet end of said second cooling jacket, an intermediate member located between said first and second housing members, and including first wall means further defining said first and second rotor cavities and second wall means further defining said first and second cooling jackets and also including an exhaust passage in alignment with said exhaust passages in said first and second housing members, and an arcuately extending third cooling jacket located at least partially inwardly of the periphery of said rotor cavities and extending adjacent to said exhaust passage in said intermediate member and including an inlet end arcuately adjacent to said outlet ends of said first and second cooling jackets and communicating with said outlet end of said first cooling jacket, and an outlet end arcuately adjacent to said inlet ends of said first and second cooling jackets and communicating with said inlet end of said second cooling jacket, and means securing together, in series, said first wall member, said first housing member, said intermediate member, said second housing member, and said second wall member.

19. A rotary internal combustion engine comprising a housing assembly including first and second housing members located in parallel, spaced relation to each other and including respective wall means partially defining first and second trochoid shaped rotor cavities, respective first additional wall means respectively defining first and second exhaust passages extending perpendicularly to the parallel relation of said first and second housing members and in spaced relation to said first and second rotor cavities, respective second additional wall means respectively defining first and second exhaust ducts extending respectively from said first and second rotor cavities to said first and second exhaust passages, and respective third additional wall means respectively defining first and second water jackets respectively extending adjacent to said first and second exhaust passages, a first wall member located adjacent to said first housing member remotely from said housing member and further defining said first rotor cavity and including a third exhaust passage communicating with said first exhaust passage, a second wall member located adjacent to said second housing member remotely from said first housing member and further defining said second rotor cavity, and an intermediate member located between said first and second housing members, further defining said first and second rotor cavities and including a fourth exhaust passage communicating with said first and second exhaust passages and a third water jacket extending to said fourth exhaust passage and being serially connected to and located between said first and second water jackets.

20. A rotary internal combustion engine in accordance with claim 19 wherein said first, second, and third water jackets each extend circumferentially.

21. A rotary internal combustion engine in accordance with claim 19 wherein said intermediate member further defines said first and second water jackets and said first wall member further defines said first water jacket and said second wall member further defines said second water jacket.

* * * * *

UNITED STATES PATENT OFFICE
CERTIFICATE OF CORRECTION

Patent No. 4,035,112      Dated July 12, 1977

Inventor(s) Eugene R. Hackbarth and Harry M. Ward III

It is certified that error appears in the above-identified patent and that said Letters Patent are hereby corrected as shown below:

Column 1, line 23    "trochiod" should be ---trochoid---.

Column 2, line 5     "furrher" should be ---further---.

Column 2, line 26    "rotary" should be ---rotor---.

Column 3, line 15    "14" should be ---15---.

Column 5, line 59    "secomd" should be ---second---.

Column 8, line 46    after the word "said" (second occurrence), insert ---second---.

Column 8, line 57    after the word "extending", insert ---adjacent---.

Signed and Sealed this

Twenty-first Day of February 1978

[SEAL]

Attest:

RUTH C. MASON
Attesting Officer

LUTRELLE F. PARKER
Acting Commissioner of Patents and Trademarks